(12) United States Patent
Benz

(10) Patent No.: US 8,893,666 B2
(45) Date of Patent: Nov. 25, 2014

(54) COGENERATION POWER PLANT

(76) Inventor: Robert P. Benz, Hermosa Beach, CA (US)

( * ) Notice: Subject to any disclaimer, the term of this patent is extended or adjusted under 35 U.S.C. 154(b) by 319 days.

(21) Appl. No.: 13/051,315

(22) Filed: Mar. 18, 2011

(65) Prior Publication Data
US 2012/0234264 A1  Sep. 20, 2012

(51) Int. Cl.
*F02B 75/00* (2006.01)
*F01K 17/02* (2006.01)

(52) U.S. Cl.
CPC . *F01K 17/02* (2013.01); *Y02E 20/14* (2013.01)
USPC .................. 123/3; 123/2; 60/670; 60/39.182

(58) Field of Classification Search
CPC ........ F01K 27/00; F02B 43/08; Y02T 10/126
USPC ............... 123/3, 41.01, 41.1, 2, 41.49, 41.63, 123/41.65; 60/653, 654, 670, 781, 783, 60/39.182, 39.465; 201/40, 14, 25; 122/7 R, 1 R
See application file for complete search history.

(56) References Cited

U.S. PATENT DOCUMENTS

| | | | | |
|---|---|---|---|---|
| 4,928,635 A * | 5/1990 | Shelor | .......................... | 122/7 R |
| 5,010,852 A * | 4/1991 | Milisavljevic | ................... | 123/21 |
| 5,517,822 A * | 5/1996 | Haws et al. | ...................... | 60/618 |
| 5,626,103 A * | 5/1997 | Haws et al. | .............. | 122/235.14 |
| 5,964,985 A * | 10/1999 | Wootten | .......................... | 201/40 |
| 6,013,158 A * | 1/2000 | Wootten | .......................... | 202/99 |
| 7,377,107 B2 * | 5/2008 | Sugioka | .......................... | 60/524 |
| 7,735,325 B2 * | 6/2010 | Ruggieri et al. | ................. | 60/651 |
| 2005/0132713 A1 * | 6/2005 | Neary | .............................. | 60/784 |
| 2010/0156104 A1 * | 6/2010 | Bottinelli | ......................... | 290/52 |
| 2010/0178624 A1 * | 7/2010 | Srinivasachar | ............... | 431/253 |

* cited by examiner

*Primary Examiner* — Noah Kamen
*Assistant Examiner* — Long T Tran
(74) *Attorney, Agent, or Firm* — John Ross; John R. Ross, III

(57) ABSTRACT

A cogeneration power plant for producing steam and electricity. A boiler burner receives fuel from a fuel source and a boiler combustion air/exhaust mixture from a boiler combustion air fan. An internal combustion engine receives fuel and air for combustion. The internal combustion engine drives an electricity generator for the production of electricity. A boiler combustion control system automatically monitors the boiler load and the combustion air and engine exhaust mixture oxygen level and temperature. The boiler combustion control system will then appropriately automatically adjust the speed of the boiler combustion air fan to provide a near stoichiometric mixture of fuel and combustion air and engine exhaust mixture so as to provide for a high burner temperature causing the reduction of $NO_x$ emissions in the boiler exhaust while maintaining a very high boiler operating efficiency.

3 Claims, 3 Drawing Sheets

COGENERATION POWER PLANT

This invention relates generally to cogeneration methods and apparatus, and more specifically relates to a cogeneration process and system which combines an internal combustion engine and a boiler to provide a cost effective high efficiency cogeneration system.

BACKGROUND OF THE INVENTION

Advances in reciprocating engine technology have resulted in substantially lower heat rates, the fuel to kilowatt efficiency exceeding 35%. As a result, newer higher efficiency engines can only produce low grade heat which in most applications precludes its use as the prime mover in the generation of steam for industrial use. Approximately 40% of the waste heat from a reciprocating engine is contained in the engine exhaust which ranges in temperature between 800 and 900 F, the remaining waste heat expelled to the engine cooling water at a temperature no higher than 240 F. Exhaust temperature from gas turbines is much higher. As a result, most cogeneration systems use lower efficiency prime movers such as gas turbines that have sufficient exhaust volume and temperature to produce higher grade heat needed for the production of steam.

About 40% of the consumption of energy by America industry is devoted to the production of steam in boilers.

Numerous combustion processes incident to power generation, generate effluent gases having an unacceptable $NO_x$ content. More specifically, the high temperatures incident to the operation of fuel-driven turbines, internal combustion engines and the like, results in the fixation of some oxides of nitrogen. These compounds are found in the effluent gases mainly as nitric oxide (NO) with lesser amounts of nitrogen dioxide ($NO_2$) and only traces of other oxides. Since nitric oxide (NO) continues to oxidize to nitrogen dioxide ($NO_2$) in the air at ordinary temperatures, there is no way to predict with accuracy the amounts of each separately in vented gases at a given time. Thus, the total amount of nitric oxide (NO) plus nitrogen dioxide ($NO_2$) in a sample is determined and referred to as "oxides of nitrogen" ($NO_x$).

$NO_x$ emissions from stack gases, engine exhausts etc., through atmospheric reactions, produce "smog" that stings eyes and may cause or contribute to acid rain. Other deleterious effects both to health and to structures are believed to be caused directly or indirectly by these $NO_x$ emissions. For these reasons, the content of oxides of nitrogen present in gases vented to the atmosphere has been subject to increasingly stringent limits via regulations promulgated by various state and federal agencies.

In recent years a mode of power production known as "cogeneration" has expanded rapidly, due in part to the Public Utility Regulatory Policy Act of 1978 (PURPA). PURPA provided financial incentive to cogenerators that sell excess electrical power and indeed mandated that utilities purchase power from cogenerators. It also allows utilities to own up to 50% of a cogeneration facility and receive the benefits of this status. Cogeneration may be defined as the simultaneous production of both useful thermal energy (usually steam), and electrical energy, from one source of fuel. In a typical system one or more power sources such as gas turbines, may be followed by a waste heat boiler using natural gas as fuel for both the turbines and to heat the exhaust gases from the turbines.

A common problem arising in cogeneration systems is the level of $NO_x$ emissions generated with the combined firing cycle. Cogeneration plants using conventional hydrocarbon-fueled power sources and auxiliary fuel fired heat-recovery boilers to produce electricity and steam are therefore being subjected to stringent $NO_x$ emission standards requiring levels below the 9 ppmv range.

Higher efficiency reciprocating engines have $NO_x$ emissions several orders of magnitude higher than these emission standards, often exceeding 1500 ppmv. Therefore, the use of higher efficiency reciprocating engines are precluded in most states without substantial emission control technology.

To meet the regulations for $NO_x$ emissions for boilers, a number of methods of $NO_x$ control have previously been employed or proposed. In one approach water or steam are injected into the combustion zone. This lowers the flame temperature and thereby retards the formation of $NO_x$, since the amount of $NO_x$ formed generally increases with increasing temperatures. Water or steam injection, however, adversely affects the overall fuel efficiency of the process as energy is absorbed to vaporize the water or heat the injectable steam, which would otherwise go toward heating the power source exhaust and be ultimately converted into usable steam.

A much more common technique for meeting regulations $NO_x$ emissions involves the use of recirculated flue gas. Flue gas exiting a boiler is mixed with combustion air which reduces oxygen content in the combustion air flue gas mixture to less than 20.9%. The reduction of available oxygen in the burner combined with the higher mass flow reduces the emissions of $NO_x$ emissions. Applicant's U.S. Pat. No. 5,511,971 describes a process for reducing emissions from a boiler by passing a mixture of recirculated flue gas and combustion air through a fan and into a burner while increasing the speed of the fan at increasing firing levels. The process has demonstrated the capability of reducing $NO_x$ emissions by greater than 85% regardless of burner design.

Specialized burner designs have been developed which in combination with increasing levels of recirculation can provide $NO_x$ emissions to meet the most strict emission limits in California. Unfortunately, the increased levels of recirculated flue gas results in substantial loss of flame stability which limits the range of operation as well as the efficiency of the approach.

It is also known to inject ammonia to selectively reduce $NO_x$. A process involving the injection of ammonia into the products of combustion is shown, for example, in Welty, U.S. Pat. No. 4,164,546. Examples of processes utilizing ammonia injection and a reducing catalyst are disclosed in Sakari et al. U.S. Pat. No. 4,106,286; and Haeflich, U.S. Pat. No. 4,572,110. While selective reduction methods ammonia injection are expensive and somewhat difficult to control, increasingly strict mandates against $NO_x$ emissions have made the use of selective catalytic reduction systems the preferred choice in the control of $NO_x$ emissions from boilers.

Temperature necessary for the reduction of the oxides of nitrogen must be carefully controlled to yield the required reaction rates, the placement of catalyst being in the flow of exhaust from boilers where temperature is in the range to assure the highest possible reduction rates.

Apparatus modifications have also been widely used or proposed as a solution to the aforementioned $NO_x$ emission problem. These include modifications to the burner or firebox to reduce the formation of $NO_x$. Although these methods can reduce the level of $NO_x$, each has its own drawbacks. Combustion equipment modifications can e.g. affect performance and limit the range of operation.

A selective catalytic reduction system is presently considered by some to be the best available control technology for the reduction of $NO_x$ from the exhaust gas of a boilers and, as a consequence, is often required equipment. Currently available selective catalytic reduction systems used for the reduction of $NO_x$ employ ammonia injection into the exhaust gas stream for reaction with the $NO_x$ in the presence of a catalyst to produce nitrogen and water vapor. Such systems typically have an efficiency of 85-90 percent when the exhaust gas stream is at a temperature within a temperature range of approximately 500° F.-700° F. The $NO_x$ reduction efficiency of the system is significantly less if the temperature is outside the stated temperature range and the catalyst may be damaged at higher temperatures.

U.S. Pat. No. 4,354,821 is also of interest in disclosing a system for combusting a nitrogen-containing fuel in such a manner as to minimize $NO_x$ formation. The fuel to be combusted is directed through a series of combustion zones having beds of catalytic materials. Air is added to each of two upstream zones to provide fuel-rich conditions to thereby minimize formation of $NO_x$ precursors. In a final zone also having a bed of catalytic material, excess air is provided to complete combustion of the fuel.

U.S. Pat. No. 4,811,555, discloses a cogeneration system wherein electrical power is generated by a gas turbine. The gaseous effluent from the turbine, together with sufficient additional fuel to produce a fuel-rich, fuel-air mixture is fed to a boiler to generate steam. Air is added to the gaseous effluent from the boiler to form a lean fuel-air mixture, and this mixture is passed over an oxidizing catalyst, with the resultant gas stream then passing to an economizer or low pressure waste heat boiler for substantial recovery of its remaining heat content. The gas, now meeting $NO_x$ emission standards, is then vented to atmosphere.

U.S. Pat. No. 4,811,555, a gas turbine constitutes the primary power source which has a substantially higher heat rate than that of the newer reciprocating gas engines. The $NO_x$ levels ultimately achieved therein are quite low, i.e. below about 50 ppmv for the final gases provided for venting. Since, however, $NO_x$ levels in the turbine exhaust are not extremely high to begin with (i.e. about 150 ppmv), the actual reduction is only moderate. Where an internal combustion engine (such as a reciprocating engine) constitutes the power source, $NO_x$ levels in the exhaust are an order of magnitude higher than in a gas turbine—a typical $NO_x$ level for such an engine being about 1500 ppmv. In this instance the exhaust stream also carries substantial particulate matter in the form of unburned carbon. It is found that with such a power source, neither the methods taught in U.S. Pat. No. 4,811,555, or those otherwise known in the prior art which preceded U.S. Pat. No. 5,022,226, are adequate or effective to economically and efficiently achieve fully acceptable $NO_x$ reduction. The problem thereby presented is particularly acute, in that the convenience, simplicity of operation, and dependability of internal combustion engines, otherwise renders same an ideal instrumentality for use in cogeneration installations, e.g. for shopping centers, industrial plants, educational facilities, medical complexes, and the like.

In U.S. Pat. No. 5,022,226, a cogeneration system is provided wherein fuel and oxygen are provided to an internal combustion engine connected to drive an electric generator, to thereby generate electricity. An exhaust stream is recovered from the engine at a temperature of about 500° F. to 1000° F. which includes from about 6 to 15 percent oxygen. Sufficient fuel is added to the exhaust stream to create a fuel-rich mixture, the quantity of fuel being sufficient to react with the available oxygen and reduce the $NO_x$ in the exhaust stream. The fuel-enriched stream is then provided to a thermal reactor means for reacting the fuel, $NO_x$ and available oxygen, to provide a heated oxygen-depleted stream. The oxygen-depleted stream is cooled in a heat exchanger. Prior to being passed over a catalyst bed under overall reducing conditions, conversion oxygen is added to the cooled stream. Such oxygen can be provided directly (i.e. as air), but can be provided by bypassing part of the exhaust stream from the engine. The quantity of conversion oxygen is stoichiometrically in excess of the amount of NO.sub. x but less (stoichiometrically) than the amount of combustibles, in consequence of which NO in the stream is oxidized to $NO_2$ at the forward end of the bed, after which the $NO_2$ is reduced in the remainder of the bed by the excess combustibles. Air is added to the resulting stream from the catalytic bed to produce a cooled stream having a stoichiometric excess of oxygen, and the stream is passed over an oxidizing catalyst bed to oxidize remaining excess combustibles. The resultant stream, vastly reduced in $NO_x$ content can then be provided for venting. By means of the U.S. Pat. No. 5,022,226 invention, the $NO_x$ content can be reduced to less than 25 ppmv—often below 15 ppmv, while CO levels are also brought to well below 50 ppmv.

What is needed is a better cogeneration power plant.

SUMMARY OF THE INVENTION

The present invention provides a cogeneration power plant for producing steam and electricity. A boiler burner receives fuel from a fuel source and a boiler combustion air/exhaust mixture from a boiler combustion air fan and produces steam for industrial use. Combustion occurs inside the burner and hot gases are generated which are used to provide heat for the boiler. An internal combustion engine receives fuel and air for combustion. The internal combustion engine drives an electricity generator for the production of electricity. An engine jacket and oil cooler are utilized to provide cooling for the engine. A water circuit is configured to remove heat from the engine jacket and oil cooler. The heated water flows through a water-to-air heat exchanger connected to the water circuit. The water-to-air heat exchanger utilizes the heated water to heat ambient air through the heat exchanger to produce heated boiler combustion air. Engine exhaust from the internal combustion engine combines with the preheated boiler combustion air in a boiler combustion air fan for producing a boiler combustion air/exhaust mixture for the burner. A boiler exhaust duct directs boiler exhaust away from the boiler. A boiler combustion control system automatically monitors the boiler load and the combustion air and engine exhaust mixture oxygen level and temperature. The boiler combustion control system will then appropriately automatically adjust the speed of the boiler combustion air fan to provide a near stoichiometric mixture of fuel and combustion air and engine exhaust mixture so as to provide for a high burner temperature causing the reduction of $NO_x$ emissions in the boiler exhaust while maintaining a very high boiler operating efficiency.

DETAILED DESCRIPTION OF THE PREFERRED EMBODIMENTS

Figure 1:
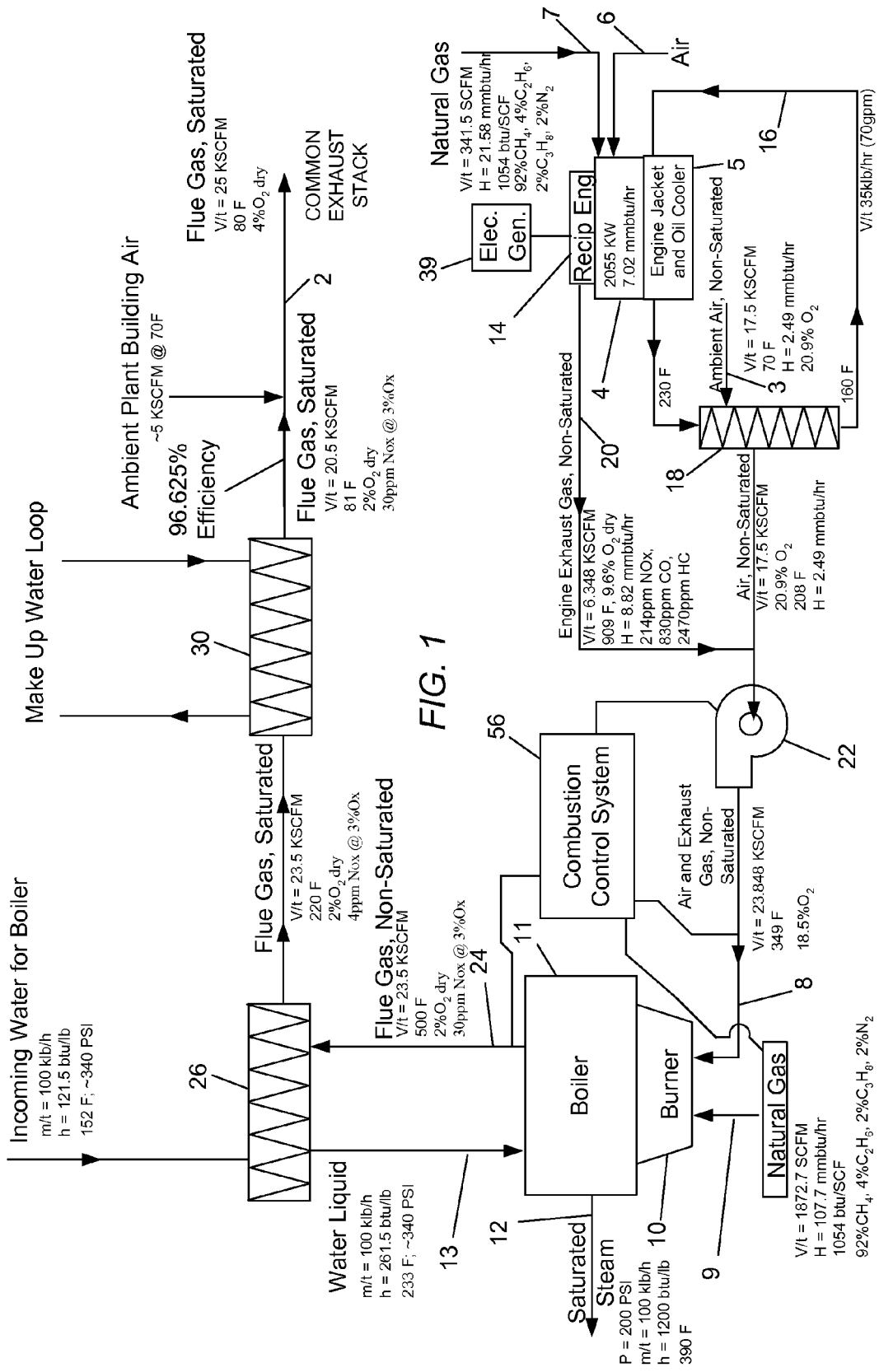
FIG. 1 shows a preferred embodiment of the present invention.

FIG. 1 shows boiler 11 and burner 10. Natural gas enters burner 10 through line 9 and air/exhaust mixture at 18.5% $O_2$ and 394 F enters burner 10 through line 8. The natural gas and air/exhaust gas mixture combust inside burner 10 generating heat and producing hot gases that exchange heat within boiler 10 with feed water from line 13 to produce saturated steam. The generated steam exits boiler 11 through line 12 at approximately 390 F.

Natural gas enters reciprocating internal combustion engine 14 through line 7. Air enters reciprocating engine 14 through line 6. Combustion occurs inside reciprocating engine 14 and engine 14 drives electrical generator 39 and electricity is produced. Water loop 16 circulates through engine jacket and cooler 5, picking up waste heat from engine block 4 and delivering the energy to water-to-air heat exchanger 18. Ambient air enters heat exchanger 18 through line 3 and is heated by the heat exchanger. Likewise, the water in water loop 16 is cooled as it passes through heat exchanger 18.

Engine exhaust flows through exhaust duct 20 and mixes with heated boiler combustion air within combustion air fan 22. The exhaust gas/air mixture discharges from fan 22 and enters burner 10 through line 8 (as explained above). As steam is created, exhaust gas exits the boiler through discharge duct 24 and is directed to liquid economizer heat exchanger 26 which heats incoming water to the boiler through transport pipe 13.

The cooler flue gas exhausts from heat exchanger 26 through transport duct 28 into a secondary heat exchanger 30. The exhaust is finally discharged through discharge duct 2 into the ambient air surrounding discharge duct 2.

Combustion Control System

Combustion control system 56 controls the speed of boiler combustion air fan 22 to provide optimum burner conditions. For example, combustion control system 56 monitors the internal combustion engine exhaust and combustion air mixture to determine its oxygen level and temperature. Accordingly, combustion control system 56 will then adjust the speed of boiler combustion air fan 22 to provide a near stoichiometric mixture, so that the high resultant boiler burner temperature will result in the reduction of engine exhaust and $NO_x$ emissions.

High Efficiency, Low $NO_x$

The cogeneration plant described above in reference to FIG. 1 has an operating efficiency of approximately 96.625%.

The cogeneration plant of FIG. 1 furthermore causes $NO_x$ emissions to be reduced to a very low level. For example, as shown in FIG. 1, after leaving reciprocating engine 14, the exhaust gas has a $NO_x$ content of approximately 214 ppm. Then after leaving boiler 11, the flue gas has a $NO_x$ content of approximately 30 ppm. Then, after leaving liquid heat exchanger 26 the flue gas has a $NO_x$ content of approximately 4 ppm. Finally, after leaving liquid heat exchanger 30, the flue gas has a $NO_x$ content that is negligible.

Non-Condensing Example

Figure 2:
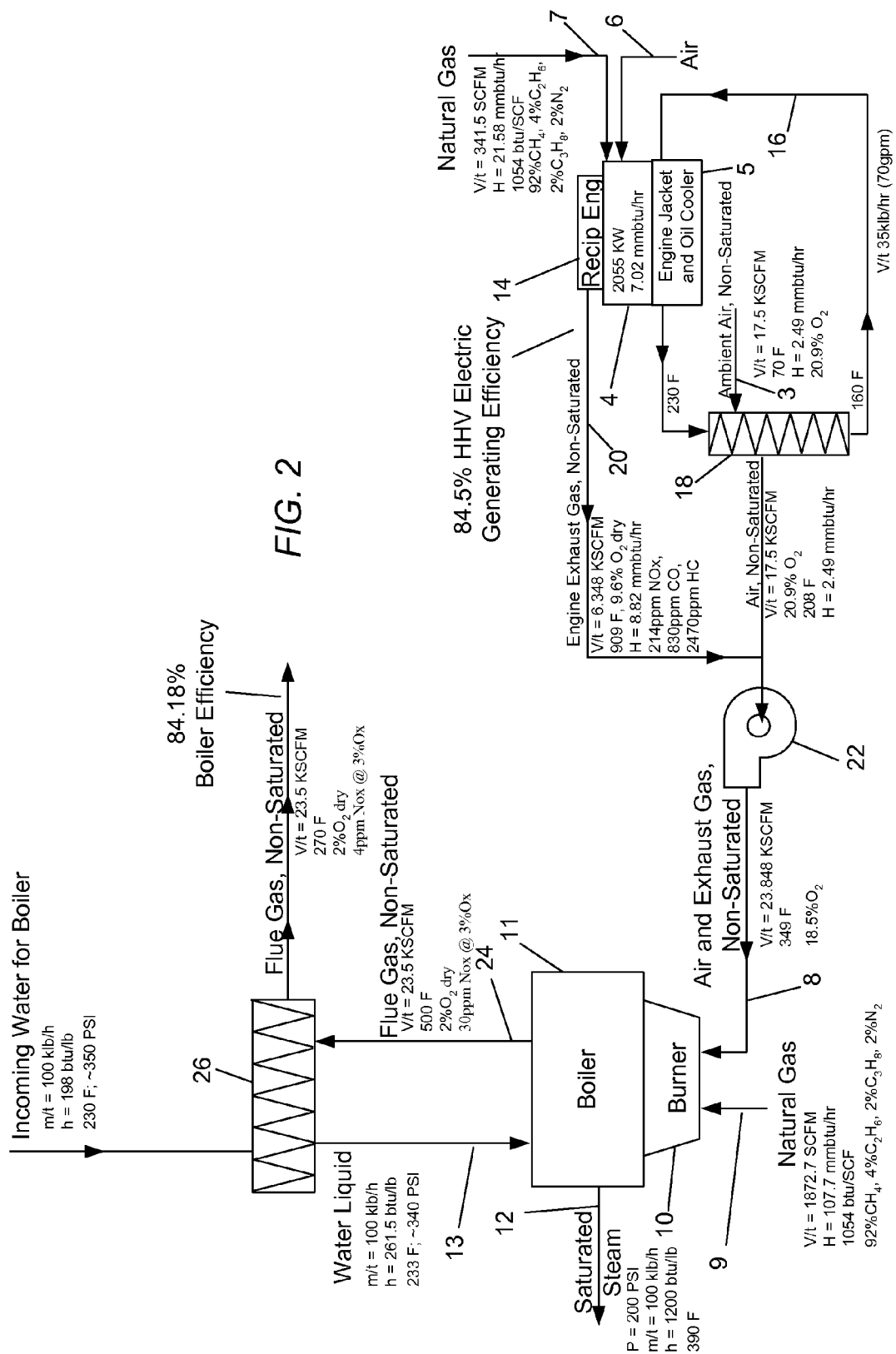
FIG. 2 shows another preferred embodiment of the present invention.

As shown in FIG. 2, in another preferred embodiment of the present invention, secondary heat exchanger 30 has been eliminated. In this preferred embodiment, the cogeneration plant provides a boiler efficiency of 84.18% with a very low $NO_x$ content of 4 ppm. Likewise, reciprocating engine 14 operates with a HHV electric generating efficiency of 84.5%.

$NO_x$ Reducing Catalyst

Figure 3:
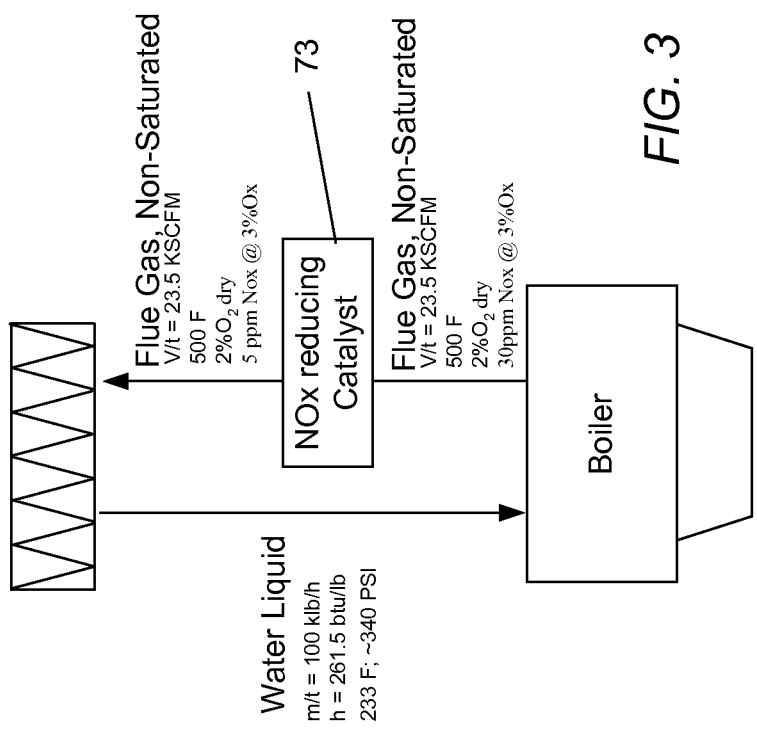
FIG. 3 shows another preferred embodiment of the present invention.

FIG. 3 shows another preferred embodiment showing the utilization of the present invention with $NO_x$ reducing catalyst 73 placed in line with the boiler exhaust duct. Utilization of $NO_x$ reducing catalyst 73 reduces $NO_x$ emissions from 30 ppm to 5 ppm.

Although the above-preferred embodiments have been described with specificity, persons skilled in this art will recognize that many changes to the specific embodiments disclosed above could be made without departing from the spirit of the invention. For example, although it was discussed in great detail how boiler 11 is utilized to produce steam, it should also be recognized that boiler 11 can be utilized to produce hot fluid, such as hot water, hot thermal, and other types of hot fluid. Therefore, the attached claims and their legal equivalents should determine the scope of the invention.

What is claimed is:

1. A cogeneration power plant for producing steam and electricity, comprising:
   A. a boiler adapted to produce steam, said boiler operating under variable boiler load,
   B. a boiler burner adapted to receive boiler combustion air and natural gas fuel to produce hot gases for said boiler,
   C. an internal combustion engine, adapted to receive natural gas fuel and air for combustion, said internal combustion engine comprising:
      1. an engine block, and
      2. engine oil,
   D. an electrical generator driven by said internal combustion energy, said electrical generator for producing electricity,
   E. a internal combustion engine exhaust output line adapted to capture engine exhaust from said internal combustion engine,
   F. an engine jacket and oil cooler connected to said internal combustion engine, said engine jacket and oil cooler for cooling said engine block and engine oil,
   G. a water circuit adapted to remove heat from said engine jacket and oil cooler,
   H. a water-to-air heat exchanger connected to said water circuit, said water-to-air heat exchanger adapted to transfer heat to ambient air to produce heated boiler combustion air,
   I. a boiler combustion air fan adapted to receive said heated boiler combustion air from said water-to-air heat exchanger and said engine exhaust from said internal combustion engine, said boiler combustion air fan adapted to produce boiler combustion air mixture for said boiler burner,
   J. a boiler exhaust duct adapted to direct boiler exhaust away from said boiler to a liquid heat exchanger adapted to heat water incoming to said boiler,
   K. and a transport duct to transport the boiler exhaust from said liquid heat exchanger to a secondary heat exchanger, and
   L. a boiler combustion control system adapted to automatically monitor said boiler load and said combustion air and engine exhaust mixture oxygen level and temperature and to adjust the speed of said boiler combustion air fan accordingly to provide a near stoichiometric mixture so as to provide optimum burner conditions at a high burner temperature causing a reduction to a negligible level of 4 ppm of $NO_x$ emissions, or lower, at an exhaust stack without use of a catalyst.

2. The cogeneration power plant as in claim 1, further comprising a $NO_x$ reducing catalyst placed in line with said boiler exhaust duct.

3. The cogeneration power plant as in claim 1, wherein said boiler is configured for the production of hot fluid.

* * * * *